(12) United States Patent
Tanaka et al.

(10) Patent No.: US 8,899,621 B2
(45) Date of Patent: Dec. 2, 2014

(54) STEERING SYSTEM

(71) Applicant: JTEKT Corporation, Osaka-shi, Osaka (JP)

(72) Inventors: Eiji Tanaka, Kitakatsuragi-gun (JP); Yoshikazu Rikitake, Sakai (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/932,216

(22) Filed: Jul. 1, 2013

(65) Prior Publication Data

US 2014/0007733 A1 Jan. 9, 2014

(30) Foreign Application Priority Data

Jul. 9, 2012 (JP) ................................. 2012-153930

(51) Int. Cl.
*B62D 1/16* (2006.01)
*B62D 15/02* (2006.01)

(52) U.S. Cl.
CPC .............. *B62D 1/16* (2013.01); *B62D 15/0215* (2013.01)
USPC ............................. 280/771; 280/775; 74/496

(58) Field of Classification Search
CPC ................... B62D 1/16; B62D 15/0215
USPC ................... 74/492, 496; 280/771, 777
See application file for complete search history.

(56) References Cited

U.S. PATENT DOCUMENTS

| 2004/0188170 | A1* | 9/2004 | Asada ............................ 180/443 |
| 2010/0064822 | A1* | 3/2010 | Debrailly et al. ........ 73/862.326 |
| 2011/0129294 | A1* | 6/2011 | Hoshino et al. ............... 403/376 |
| 2011/0284312 | A1* | 11/2011 | Aizawa et al. ................ 180/443 |
| 2012/0118099 | A1* | 5/2012 | Bless .............................. 74/493 |

FOREIGN PATENT DOCUMENTS

| EP | 0 117 611 A2 | 9/1984 |
| EP | 1 541 299 A1 | 6/2005 |
| JP | A-2000-234629 | 8/2000 |
| JP | A-2000-280915 | 10/2000 |
| WO | WO 2005/005231 A1 | 1/2005 |

OTHER PUBLICATIONS

Extended European Search Report issued in European Application No. 13175054.9 issued on May 2, 2014.

* cited by examiner

*Primary Examiner* — Ruth Ilan
(74) *Attorney, Agent, or Firm* — Oliff PLC

(57) ABSTRACT

A steering system includes a column shaft that is supported by a column tube so that the column shaft is able to rotate. A male serration is formed in a lower end of a lower shaft of the column shaft in an axial direction. A universal joint connects the lower shaft with an intermediate shaft. A first portion of the male serration is fitted to a serration hole of a rotor of a steering angle sensor, and a second portion of the male serration is fitted to a serration hole of a first yoke of the universal joint.

3 Claims, 2 Drawing Sheets

STEERING SYSTEM

INCORPORATION BY REFERENCE/RELATED APPLICATION

This application claims priority to Japanese Patent Application No. 2012-153930 filed on Jul. 9, 2012 the disclosure of which, including the specification, drawings and abstract, is incorporated herein by reference in its entirety.

BACKGROUND OF THE INVENTION

1. Field of the Invention

The invention relates to a steering system.

2. Discussion of Background

A steering system has been proposed in which a steering angle sensor that detects a steering angle is fitted to a lower end of a steering column (for example, WO 2005/005231A1). A lower end of a column shaft, which projects from the lower end of the steering column, is connected to an intermediate shaft via a universal joint.

Typically, a column shaft is provided with a width-across-flat forming portion that serves as a sensor fitting portion to which a rotor of a steering angle sensor is fitted, and a male serration forming portion that serves as a universal joint yoke fitting portion to which a yoke of a universal joint is fitted. However, in the column shaft, outer diameters of the width-across-flat forming portion and the male serration forming portion are different from each other, and machining manners for the width-across-flat forming portion and the male serration forming portion are different from each other. Therefore, a tapered portion for connecting the width-across-flat forming portion with the male serration forming portion, and a relief portion for machining are provided between the width-across-flat forming portion and the male serration forming portion. Thus, there has been a problem that an entire length of machined portions including the tapered portion and the relief portion is increased in an axial direction of the column shaft.

SUMMARY OF THE INVENTION

The invention provides a steering system in which a fitting length for a rotor of a steering angle sensor and a yoke of a universal joint is reduced in an axial direction of a column shaft.

According to a feature of an example of the invention, there is provided a steering system including: a column shaft which is supported by a column tube so that the column shaft is able to rotate, and in which a male serration is formed in a lower end in an axial direction; a steering angle sensor that includes a rotor having a serration hole that is fitted to a first portion of the male serration, and a stator that surrounds the rotor and is fixed to the column tube; and a universal joint that includes a yoke having a serration hole that is fitted to a second portion of the male serration.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
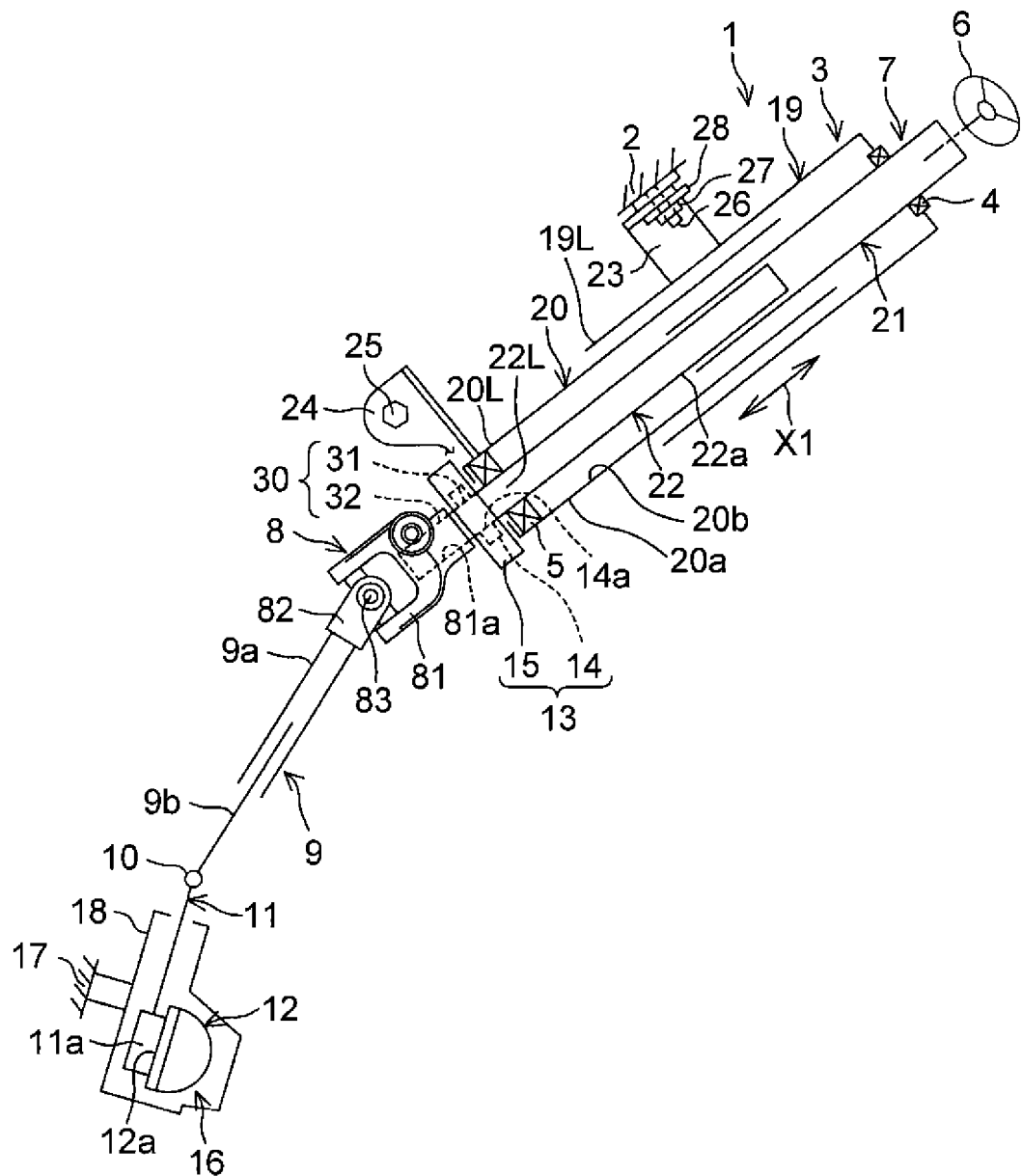
FIG. 1 is a schematic side view of a steering system according to an embodiment of the present invention.

FIG. 1 is a schematic configuration diagram of a steering system according to an embodiment of the present invention. With reference to FIG. 1, a steering system 1 includes a column tube 3 that is fixed to a vehicle body-side member 2, and a column shaft 7 that is supported by the column tube 3 via a pair of bearings 4 and 5 at upper and lower sides so that the column shaft 7 is able to rotate. A steering member 6 such as a steering wheel is connected to an upper end of the column shaft 7.

The steering system 1 also includes an intermediate shaft 9 that is connected to a lower end of the column shaft 7 in an axial direction X1 via a universal joint 8, a pinion shaft 11 that is connected to a lower end of the intermediate shaft 9 in the axial direction X1 via a universal joint 10, and a rack shaft 12 that serves as a steered shaft, and that has a rack 12a that meshes with a pinion 11a provided in the vicinity of an end portion of the pinion shaft 11. The steering system 1 is configured as an electric power steering system in which a steering assist force from an electric motor (not shown) is applied to the pinion shaft 11 or the rack shaft 12.

A steering angle sensor 13 that detects a steering angle is arranged in a lower end of the column tube 3 in the axial direction X1 (corresponding to a later-described lower end 20L of a lower tube 20 in the axial direction X1). The steering angle sensor 13 includes a rotor 14 that rotates together with the column shaft 7, and a stator 15 that concentrically surrounds the rotor 14 and is fixed to the column tube 3.

A rack and pinion mechanism, which includes the pinion shaft 11 and the rack shaft 12, constitutes a steered mechanism 16. The rack shaft 12 is supported by a housing 18 fixed to a vehicle body-side member 17 so that the rack shaft 12 is able to move in an axial direction that extends along a right-left direction of a vehicle. Each end portion of the rack shaft 12 is connected to a steered wheel via a corresponding tie rod and a corresponding knuckle arm.

The column tube 3 includes an upper tube 19 and the lower tube 20 that are fitted to each other so as to be able to slide with respect to each other in the axial direction X1. One of the upper tube 19 and the lower tube 20 constitutes an inner tube, and the other of the upper tube 19 and the lower tube 20 constitutes an outer tube. The present embodiment will be explained based on an example in which the upper tube 19 that serves as the outer tube is fitted to an outer periphery 20a of the lower tube 20 that serves as the inner tube.

The column shaft 7 includes an upper shaft 21 and a lower shaft 22 that are fitted to each other by using splines so as to be able to slide with respect to each other in the axial direction X1 and rotate together with each other. One of the upper shaft 21 and the lower shaft 22 constitutes an inner shaft, and the other of the upper shaft 21 and the lower shaft 22 constitutes a tubular outer shaft. The present embodiment will be explained based on an example in which the upper shaft 21 that serves as the tubular outer shaft is fitted to an outer periphery 22a of the lower shaft 22 that serves as the inner shaft.

The upper tube 19 is fixed to the vehicle body-side member 2 via an upper bracket 23. The lower tube 20 is fixed to a vehicle body as a lower bracket 24, which is fixed to the lower end 20L of the lower tube 20 in the axial direction X1, is fixed to a vehicle body-side member such as a cross member via a fixing bolt 25.

The upper bracket 23 is fixed to a column bracket that is fixed to the upper tube 19. The upper bracket 23 is fixed to the vehicle body-side member 2 by using a stud bolt 26 that projects downward from the vehicle body-side member 2, a nut 27 that is screwed to the stud bolt 26, and a capsule 28 that is detachably held by the upper bracket 23. At the time of secondary collision of the vehicle, the upper bracket 23 is disconnected from the vehicle body-side member 2 due to breakage of the capsule 28, and moves together with the upper tube 19 downward in the axial direction X1. The intermediate shaft 9 includes an outer shaft 9a (for example, an upper shaft) and an inner shaft 9b (for example, a lower shaft) that are fitted to each other by splines so as to be able to slide with respect to each other in the axial direction.

Figure 2:
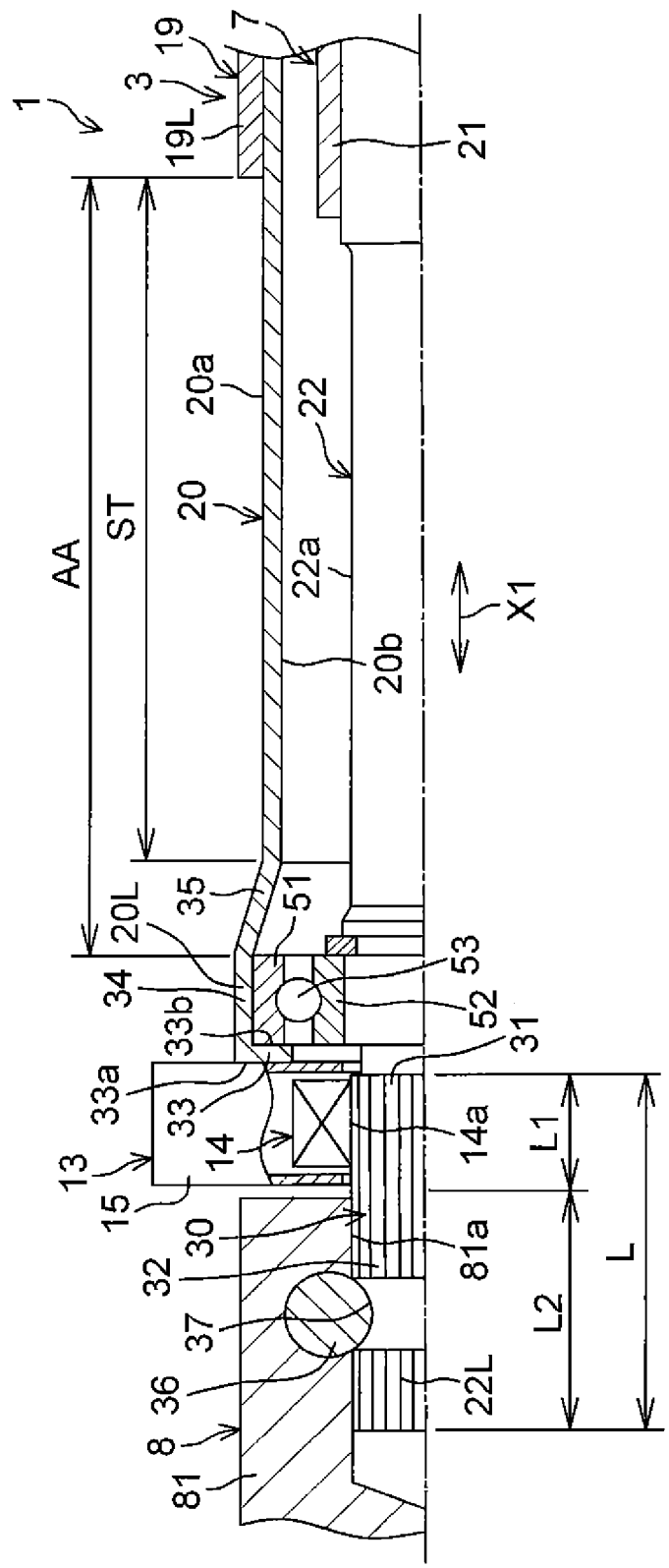
FIG. 2 is a schematic sectional view of a lower part of a steering column.

As shown in FIG. 2, a lower end 22L of the lower shaft 22 in the axial direction X1, which serves as a lower end of the column shaft 7 in the axial direction X1, projects from the lower end 20L of the lower tube 20 in the axial direction X1. A male serration 30 is formed in the outer periphery 22a of the lower end 22L of the lower shaft 22. The male serration 30 includes: a first portion 31 that serves as a rotor fitting portion formed of an axial upper portion to which the rotor 14 of the steering angle sensor 13 is fitted; and a second portion 32 that serves as a yoke fitting portion formed of an axial lower portion to which the universal joint 8 (a first yoke 81 described later) is fitted. The rotor 14 of the steering angle sensor 13 has a serration hole 14a that is fitted to the first portion 31 of the male serration 30. A female serration that meshes with the first portion 31 of the male serration 30 is formed in an inner periphery of the serration hole 14a.

A circular end wall 33 is provided in the lower end 20L of the lower tube 20 in the axial direction X1. The stator 15 of the steering angle sensor 13 is fixed to an outer end surface 33a of the end wall 33 by using a fixing member (not shown) such as a nail and a bolt. The bearing 5 at a lower side in the axial direction X1 is held by the lower tube 20, and supports the lower shaft 22 so that the lower shaft 22 is able to rotate. The bearing 5 includes an outer ring 51 that is fitted and fixed to an inner periphery 20b of the lower end 20L of the lower tube 20, an inner ring 52 that is fitted to the outer periphery 22a of the lower shaft 22 so that the inner ring 52 is able to rotate together with the lower shaft 22, and a plurality of rolling elements 53 that are provided between the outer ring 51 and the inner ring 52. An end surface of the outer ring 51 of the bearing 5 contacts an inner end surface 33b of the end wall 33 of the lower tube 20, and is thus positioned in the axial direction X1.

When an impact is absorbed at the time of secondary collision of the vehicle, the upper tube 19 moves downward in the axial direction X1. An impact absorbing stroke ST that is a distance of axial movement of the upper tube 19 is set within an axial area AA of the lower tube 20 between the bearing 5 and a lower end 19L of the upper tube 19 in the axial direction X1. Specifically, the lower tube 20 includes a bearing holding portion 34 whose diameter is increased so as to hold the bearing 5, and a tapered portion 35 that is connected to an axial upper side of the bearing holding portion 34. When an impact is absorbed, the upper tube 19 is able to move downward until the upper tube 19 comes close to the tapered portion 35. Therefore, the impact absorbing stroke ST corresponds to a distance between the lower end 19L of the upper tube 19 in the axial direction X1, and the tapered portion 35.

The universal joint 8 includes the first yoke 81 that has a serration hole 81a fitted to the second portion 32 of the male serration 30 of the lower shaft 22, a second yoke 82 that is fixed to an upper end of the intermediate shaft 9 (an upper end of the outer shaft 9a), and a cross shaft 83 that connects the first yoke 81 with the second yoke 82. A female serration, which meshes with the second portion 32 of the male serration 30, is formed in an inner periphery of the serration hole 81a.

In the male serration 30 of the lower shaft 22, the sum of a shaft length L1 of the first portion 31 for fitting the rotor 14, and a shaft length L2 of the second portion 32 for fitting the first yoke 81 corresponds to a fitting length L of the lower shaft 22 in the axial direction X1 for fitting the rotor 14 of the steering angle sensor 13 and the first yoke 81 of the universal joint 8. A circumferential groove 37 is provided in an intermediate portion of the second portion 32 of the male serration 30 in the axial direction X1, and a fastening bolt 36 is engaged with the circumferential groove 37 when the lower end 22L of the lower shaft 22 is fitted on the first yoke 81. As the fastening bolt 36 is engaged with the circumferential groove 37, the lower shaft 22 is retained in the serration hole 81a.

According to the present embodiment, the same male serration 30 (specifically, the first portion 31 and the second portion 32) of the column shaft 7 (the lower shaft 22) is fitted to the serration hole 14a of the rotor 14 of the steering angle sensor 13, and to the serration hole 81a of the first yoke 81 of the universal joint 8. Therefore, in the column shaft 7, it is possible to reduce the fitting length L for the steering angle sensor 13 (the rotor 14) and the universal joint 8 (the first yoke 81) in the axial direction X1.

With respect to the axial direction X1 of the column shaft 7, it is also possible to arrange the bearing 5 at a lowered position in the axial direction X1 due to the reduction of the fitting length L for the steering angle sensor 13 (the rotor 14) and the universal joint 8 (the first yoke 81). Thus, it is possible to secure the long impact absorbing stroke ST that is a distance of axial movement of the upper tube 19 with respect to the lower tube 20. The bearing 5 is positioned in the axial direction X1 by the end wall 33 of the lower tube 20, to which the stator 15 of the steering angle sensor 13 is fixed. Therefore, it is possible to practically dispose the bearing 5 at a lowered position in the axial direction X1, thereby practically securing the long impact absorbing stroke ST.

The present invention is not limited to the foregoing embodiment. For example, the upper tube 19 may be the inner tube, and the lower tube 20 may be the outer tube that is fitted to an outer periphery of the upper tube 19. Also, the upper shaft 21 may be the inner shaft, and the lower shaft 22 may be the tubular outer shaft that is fitted to an outer periphery of the upper shaft 21. Various other changes may be made within the scope of the claims stated in the present invention.

What is claimed is:

1. A steering system, comprising:
a column shaft which is supported by a column tube so that the column shaft is able to rotate, and in which a male serration is formed in a lower end in an axial direction;
a steering angle sensor that includes a rotor having a serration hole that is fitted to a first portion of the male serration, and a stator that surrounds the rotor and is fixed to the column tube; and
a universal joint that includes a yoke having a serration hole that is fitted to a second portion of the male serration.

2. The steering system according to claim 1, wherein the column tube includes a lower tube, to which the stator is fixed, and an upper tube fitted to the lower tube, and the column tube is able to contract in the axial direction when an impact is absorbed, the column shaft includes a lower shaft in which the male serration is formed, and an upper shaft fitted to the lower shaft, and the column shaft is able to contract in the axial direction, the steering system further includes a bearing that is held at a lower end of the lower tube in the axial direction, and that supports the lower shaft so that the lower shaft is able to rotate, and an impact absorbing stroke that is a distance of axial movement of the upper tube is set within an axial area of the lower tube between the bearing and a lower end of the upper tube in the axial direction.

3. The steering system according to claim 2, wherein a lower end of the lower shaft in the axial direction projects from the lower end of the lower tube in the axial direction, the lower tube has a circular end wall provided in the lower end of the lower tube in the axial direction, and the end wall includes an outer end surface to which the stator is fixed, and an inner end surface by which an outer ring of the bearing is positioned in the axial direction.

* * * * *